Jan. 26, 1960 T. J. HIGGINS, JR 2,922,190
METHOD AND APPARATUS FOR FLATTENING BEADED EDGES OF A FILM
Filed Sept. 21, 1955

United States Patent Office 2,922,190
Patented Jan. 26, 1960

2,922,190

METHOD AND APPARATUS FOR FLATTENING BEADED EDGES OF A FILM

Thomas J. Higgins, Jr., Fredericksburg, Va., assignor to American Viscose Corporation, Philadelphia, Pa., a corporation of Delaware Application September 21, 1955, Serial No. 535,601

11 Claims. (Cl. 18—15)

My present invention relates to a method and apparatus for processing plastic film material. In particular, my invention relates to a method and apparatus for substantially leveling or flattening the raised or beaded edges of plastic film which are necessarily formed on the plastic film during the film formation and processing.

In the production of plastic films such as regenerated cellulose films, it has been desirable in the original formation or extrusion of the film from the film-forming material to provide a film having edges which are thicker than the remaining or central portions of the film. This may be accomplished by widening the film casting slot adjacent the slot edges. Generally however, the beads will form on their own accord when using slots of uniform size because of higher extruding pressure at the ends of the slot and because of more rapid shrinkage of the film along its edge portions as it passes into the coagulating bath. The marginal edges of the film present more surface area to the bath than do the more central portions of the film. The raised or beaded edges on the film are helpful in preventing the initially formed weak-strength film from breaking as it travels through the various processing stages such as regenerating, washing, and other treating stages.

Although the raised or beaded edges have been found helpful in eliminating tearing or ripping of the film during the processing and treating of the film, they create a problem in the final winding up of the film on collecting rollers and in the coating of the film, if the film is to be coated. As the beaded edge film is collected in roll form on a rotating collecting roller, the beads create high end sections in the roll of film so that the final roll has a curved rather than an even surface across its width. Because of the high end sections in the roll of collected film, wrinkles and creases are formed in the edge portions of the film material throughout the roll thickness. Such distortion of the film necessitates the trimming of four to six inches of film material from each side of the sheet. The trimmed edges must be scrapped which results in quite a loss to the manufacturer.

The raised or beaded edges on the film also create a problem when the film is coated. The coating solution is trapped adjacent the edges of the film by the beaded edges of the film. The trapped coating solution will slosh around on the film being coated thus creating streaks and layers of coating of non-uniform thickness across the width of the final sheet.

It is therefore one object of my invention to provide a new and novel method and apparatus for substantially eliminating the raised or beaded edges of a plastic film after it has been formed and before the film is collected on suitable collecting rollers.

Other objects and advantages of my invention will become more apparent from a study of the following description and drawings wherein.

Figure 1:
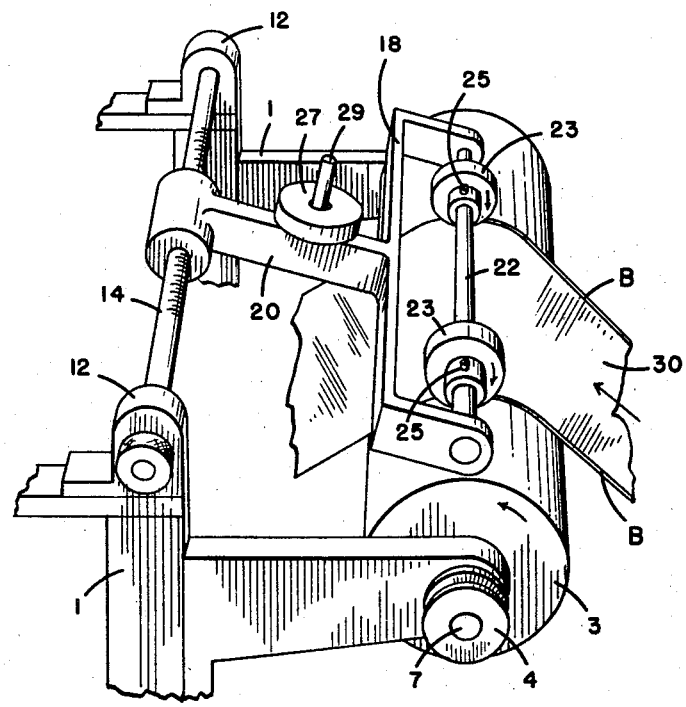
Figure 1 is a perspective of one embodiment of my apparatus for substantially eliminating the beaded edges of a plastic film.

Referring now to the drawings my invention will be described in its preferred form. As seen in Figure 1, my apparatus for substantially eliminating the beaded edges of a plastic film comprises a pair of supports 1, 1 in which is journaled a smooth surfaced film-supporting roll 3 which is driven through pulley 4 affixed to the roll shaft 7. A bearing 12 is mounted to the top of each support 1 which bearings support a shaft 14. A bracket 18 is affixed to an arm 20 pivotally mounted on the shaft 14 adjacent the middle of the shaft. When the bracket 18 is in operating position, it lies immediately above the roll 3. A bracket shaft 22 is journaled in the bracket arms and supports a pair of smooth surface rollers 23, 23 which are secured to the shaft by screws 25, 25. To vary the amount of pressure applied by the rollers 23, 23, a weight 27, or weights, may be positioned on peg 29 extending from the bracket arm 20. As seen in the drawing, the diameter of the pressure rolls is substantially smaller than that of the processing roll 3.

In operation, the film 30 after it has been through the processing stages and while it is still in the softening state is threaded over the driven roll 3 which may be the first roll in the drying stage. The position of each of the pressure applying rollers 23, 23 is then adjusted on the bracket shaft 22 in accordance with the width of the film 30 traveling over the roll 3 so that each roller 23 will ride upon a beaded edge B of the film 30. The bracket 18 is then swung into position so that the rollers 23, 23 are in contact with the beaded edges of the film. If additional or less pressure is required to flatten the beaded edges of the film the number of weights 27 on the peg 29 affixed to the bracket supporting arm 20 may be varied. The rollers 23, 23 and the bracket shaft 22 are rotated through contact with the traveling film material 30.

Figure 2:
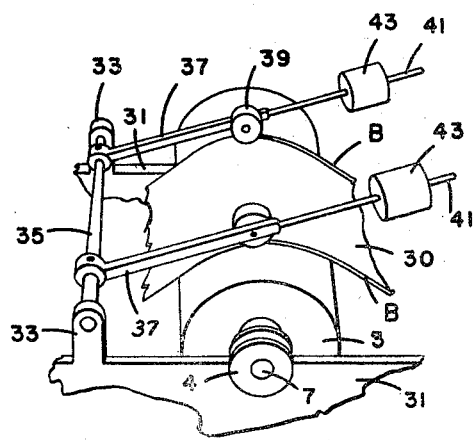
Figure 2 is a perspective of another embodiment of my invention.

In Figure 2 another embodiment of my invention is shown. As seen therein, the film supporting driven roll 3 is journaled in supports 31, 31. Mounted on the top of each support 31 is a bearing 33 which supports a shaft 35. The shaft 35 has affixed thereto arms 37, 37 which when in operating position lie immediately above the roll 3. Pressure applying rollers 39, 39 which have smooth surfaces and are of substantially smaller diameter than the processing roll 3 are supported by the arms 37, 37 adjacent the opposite end of the arms. The arms 37, 37 in turn support rods 41, 41 which receive weights 43, 43 slidable on the rods. In operation, the still soft film 30 is threaded over the driven roll 3 after which the position of the arms 37, 37 are adjusted on the shaft 35 in accordance with the width of the film 30. The arms 37, 37 are then swung into position so that the pressure applying rollers 39, 39 contact the beaded edge portions B, B of the film 30. To vary the amount of pressure applied by the rollers 39, 39 to the beaded edges of the film, the weights 43, 43 may be moved either backward or forward along rods 41, 41.

Figure 3:
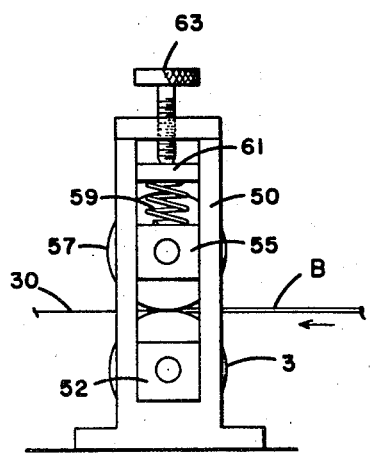
Figure 3 is a side view of still another embodiment of my invention.

The embodiment of Figure 3 includes a pair of open frame supports 50 (only one being shown) each of which supports a fixed bearing 52 in which is journaled a roller smooth surface 3 over which the plastic film material 30 travels. Also positioned within each open frame support 50 above the fixed bearing 52 is a vertically adjustable bearing 55. Each adjustable bearing 55 rotatably supports a single pressure applying smooth surface roller 57 which rollers are adapted to contact the beaded edges B, B of the film 30 traveling over the roll 3. To vary or adjust the amount of pressure exerted by each roller 57 against the beaded edge B of the film 30, a compression spring 59 is positioned between the top of the vertically adjustable bearing 55 and a vertically slidable plate 61 positioned within each opened frame support 50 above the adjustable bearing 55. To adjust the compression of the spring 59 and in turn adjust the pressure applied to the beaded edges B, B of film 30 by rollers 57, 57, an adjusting screw 63 is provided which extends through the top of each open frame support 50 to contact the plate 61 within the frame.

In operation, the film 30 in a softened state is threaded over the driven roll 3 while maintaining the rollers 57 out of contact with the film. The pressure rollers are then permitted to fall in position against the beaded edges B, B of the film 30. The pressure applied by the rollers 57, 57 to the beaded edges of the film 30 may be adjusted and controlled by rotating each adjusting screw 63 in a clockwise or counter-clockwise direction.

With all the embodiments of my apparatus, it is seen that the pressure-applying rolls operate at any time during rotation of the film-processing roll only against a small portion of the circumferential surface area of the film-processing roll. As seen in Figures 1 and 2 of applicant's drawing, the path of the film 30 follows or makes contact with a substantial portion of the circumferential surface of the film-processing roll 3. With such an arrangement, the marginal portions of the film may thereby also be exposed to a film-processing operation (such as drying) on a substantially equal basis with the remaining or more central portions of the film as the film travels over the processing roll. The pressure rolls do not therefore interfere with the treatment of the edge portions of the film as provided by the film-processing roll.

It should also be pointed out that it would be impractical to use only one pressure roller extending the width of the film for flattening the raised or beaded edges of the film. The central or thinner portions of the film, especially in the case of regenerated cellulose, are of very weak strength immediately after the initial processing stages because of their heavily saturated condition. It would be virtually impossible to apply any amount of pressure directly against the thinner or central portions of the weak strength film since the slightest pressure would crush or materially weaken the film. Various treating agents incorporated within the film during the processing stages which are intended to remain within the film would be removed because of the pressure applied thereto. Also the gauge of the film would be non-uniform since the applied pressure would tend to spread the film out toward its edges. The pressure must therefore be limited to the raised or thicker edges of the traveling film which are capable of resisting tearing or ripping and other damage because the thicker edge portions are stronger than the thinner central sections of the film.

It should be further understood that the film edges which have been flattened in accordance with my invention will not be straight and will have to be trimmed from the finished film. However, instead of trimming four or five inches from each edge of the film as with prior practice, only ¼ to ½ of an inch need be trimmed from the final film. Also, it should be pointed out that the marginal portions of the film are uniformly flattened to give smooth even surfaces.

It is to be understood that changes and variations may be made without departing from the spirit and scope of the present invention as defined in the appended claims.

I claim:

1. An apparatus for substantially flattening the beaded edges of a continuously traveling plastic film during its manufacture and while the film is in its formative state which beaded edges were formed during the film formation to the thickness assumed by the remaining portion of the film comprising a pair of supports, a drying roll journaled in the supports and over which the film travels, a shaft journaled in the supports at a point spaced from said drying roll, a bracket affixed to the shaft which bracket when in operating position extends from the shaft to a point above the drying roll, and a pair of spaced-apart pressure-applied rolls having a smooth surface journaled in the bracket for applying pressure to the beaded edges only of the film traveling over the drying roll, said pressure-applying rolls having substantially smaller diameters than the drying roll diameter whereby they operate at any time during rotation of the fim-drying roll only against a comparatively small circumferential surface area of the drying roll to permit the film edges to receive substantially the same drying treatment as the remaining portion of the film.

2. An apparatus for substantially flattening the beaded edges of a plastic film during its manufacture according to claim 9 wherein the pressure-applying rolls are supported on a shaft journaled in the bracket.

3. An apparatus for substantially reducing the beaded edges of a plastic film during its manufacture according to claim 10 comprising means for adjusting and controlling the position of the pressure-applying rollers on the bracket shaft whereby the rollers may be moved closer together or further apart.

4. An apparatus for substantially flattening a beaded edge of a plastic film during its manufacture according to claim 10 comprising means for adjusting the amount of pressure exerted upon the film edges by the pressure-applying rollers mounted on the bracket shaft.

5. An apparatus for substantially flattening the beaded edges of a plastic film during its manufacture and while the film is in a softened state which beaded edges were formed during the film formation comprising a pair of supports, a rotating, cylindrical and smooth surfaced film-processing roll journaled in the supports over which the film travels, a bearing mounted upon each support, a shaft journaled in the bearings, a pair of arms affixed to the shaft which arms when in operating position extend to a point above the processing roll, and a roller having a smooth surface mounted on each arm for applying pressure to the sheet edges traveling over the rotating surface, said pressure-applying rolls having substantially smaller diameters than the film-processing roll diameter whereby they operate at any time during rotation of the film-processing roll only against a comparatively small circumferential surface area of the film-processing roll to permit the film edges to receive substantially the same processing treatment as the remaining portion of the film.

6. An apparatus for substantially flattening the beaded edges of a plastic film during its manufacture according to claim 5 comprising means for adjusting the amount of pressure exerted upon the film edges by the pressure applying rollers.

7. An apparatus for substantially flattening the beaded edges of a plastic film during its manufacture according to claim 5 comprising means for adjusting the position of the pressure applying rollers in their shaft.

8. An apparatus for substantially flattening the beaded edges of a plastic film during its manufacture and before the film is dried which beads were formed during the film formation comprising a pair of supports, a lower rotatable, cylindrical and smooth surfaced film-processing roll journaled in the supports over which the film travels, and a pair of upper vertically adjustable pressure applying rollers having smooth surface and journaled in the vertical supports which cooperate with the film-processing roll for applying pressure to the edges of the film passing over the surface, said pressure-applying rolls having substantially smaller diameters than the film-processing roll diameter whereby they operate at any time during rotation of the film-processing roll only against a comparatively small circumferential surface area of the film-processing roll to permit the film edges to receive substantially the same processing treatment as the remaining portion of the film.

9. An apparatus for substantially flattening the beaded edges of a plastic film during its manufacture and before the film is dried which beads were formed during the film formation comprising a pair of open frame supports, a smooth surfaced drying roll over which the film travels which roll is journaled in the open frame supports adjacent the bottom of the frames, a vertically adjusting bearing positioned above said drying roll within each open frame support, a smooth surfaced pressure applying roller journaled in each bearing for applying pressure to the beaded film edges of the film passing over the drying roll, a compression spring positioned between the top of each bearing and a vertically slidable plate positioned above the bearing in each frame support, and an adjusting screw extending through the top of each frame support which screw contacts the plate whereby the compression force of the spring against the bearing for the pressure roller may be varied to adjust and control the amount of pressure applied by each roller to a beaded edge of a film traveling over the drying roll, said pressure-applying rolls having substantially smaller diameters than the drying roll diameter whereby they operate at any time during rotation of the film-drying roll only against a comparatively small circumferential surface area of the drying roll to permit the film edges to receive substantially the same drying treatment as the remaining portion of the film.

10. In the production of continuous regenerated cellulose film, a method for substantially flattening the raised or beaded edges of the film during the film manufacture which edges were formed during the film extrusion and processing comprising the steps of continuously passing the film in its formative state over a rotating drying roll, said film contacting a substantial portion of the circumferential surface of the drying roll, and applying pressure to the beaded edges only of the film as it passes over the drying roll to reduce the edge thickness of the film to correspond to the thickness of the remaining portion of the film, said pressure being applied against only a small section of that total portion of the film edges which lie in contact with the roll surface whereby the film edges receive substantially the same drying treatment as the remaining portion of the film as the film passes over the drying roll.

11. An apparatus for substantially flattening the beaded edges formed on a plastic film during its manufacture and while the film is in its formative state to the thickness assumed by the remaining portion of the film comprising a pair of supports, a film processing roll journalled in each support, and rotatable pressure-applying rolls having smooth surfaces and mounted on the supports for applying pressure to the beaded edges of the film as it travels over the film processing roll, said pressure-applying rolls are of substantially smaller diameter than the film-processing roll whereby they operate at any time during rotation of the film-processing roll only against a comparatively small circumferential surface area of the film-processing roll to permit the film edges to receive substantially the same processing treatment as the remaining portion of the film.

References Cited in the file of this patent

UNITED STATES PATENTS

| | | |
|---|---|---|
| 1,651,744 | Van Derhoef | Dec. 6, 1927 |
| 2,067,522 | Etzkorn et al. | Jan. 12, 1937 |
| 2,095,149 | Miller | Oct. 5, 1937 |
| 2,168,288 | Fischer | Aug. 1, 1939 |
| 2,560,038 | Trainer | July 10, 1951 |
| 2,698,967 | Reichel et al. | Jan. 11, 1955 |
| 2,700,177 | Mottet | Jan. 25, 1955 |

UNITED STATES PATENT OFFICE

CERTIFICATE OF CORRECTION

Patent No. 2,922,190                      January 26, 1960

Thomas J. Higgins, Jr.

It is hereby certified that error appears in the printed specification of the above numbered patent requiring correction and that the said Letters Patent should read as corrected below.

Column 1, line 22, before "desirable" insert -- found --; column 4, line 15, for the claim reference numeral "9" read -- 1 --; lines 19 and 25, for the claim reference numeral "10", each occurrence, read -- 2 --; column 6, line 34, list of references cited, for "Jan. 11, 1955" read -- June 11, 1955 --.

Signed and sealed this 28th day of June 1960.

(SEAL)
Attest:

KARL H. AXLINE
Attesting Officer

ROBERT C. WATSON
Commissioner of Patents